April 20, 1965  G. N. BLISS  3,179,267
EXTENSIBLE CHAIN BOOM
Filed Oct. 3, 1963  11 Sheets-Sheet 3

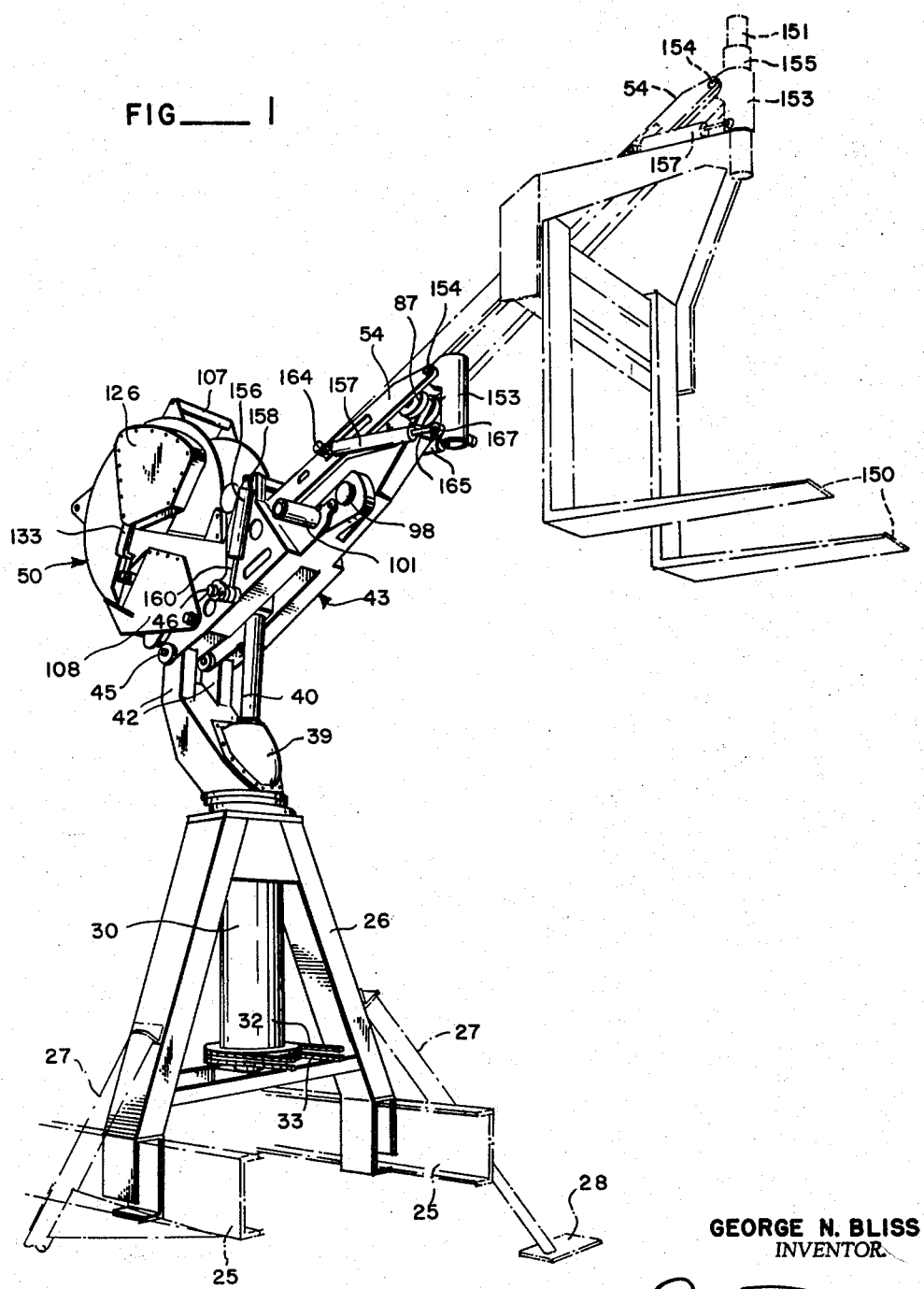

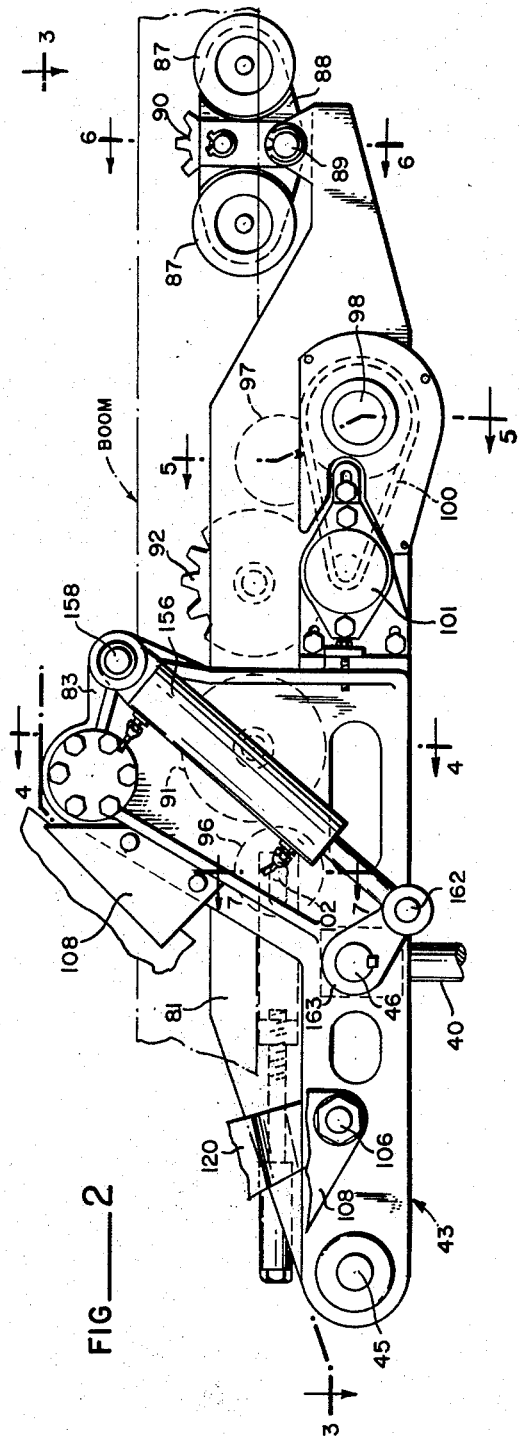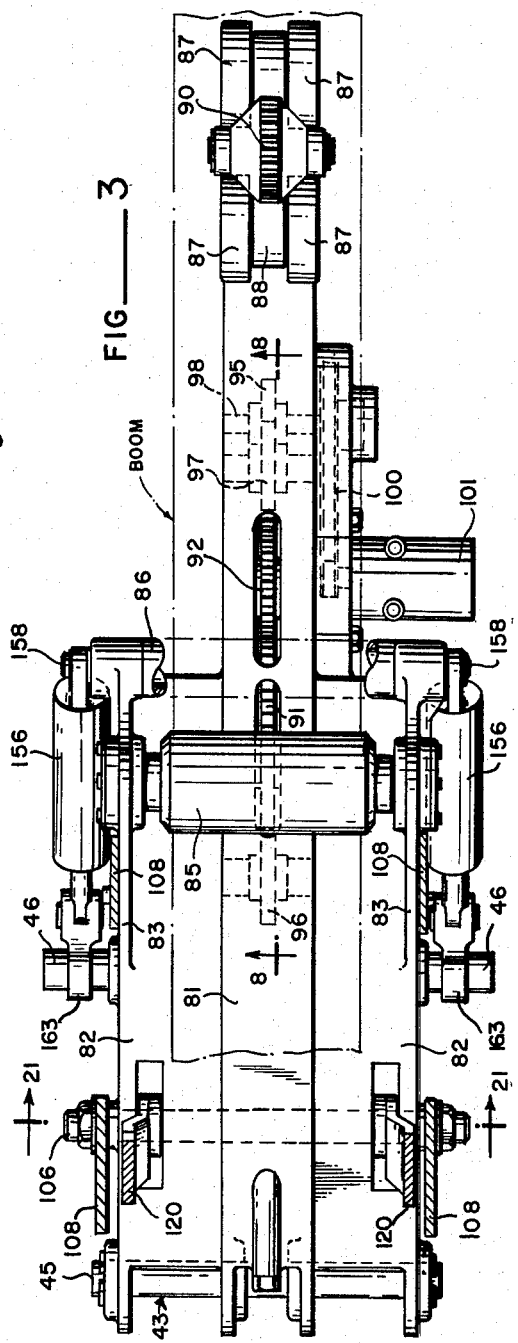

GEORGE N. BLISS
INVENTOR.

BY Sear & Berry

ATTORNEYS

April 20, 1965 G. N. BLISS 3,179,267
EXTENSIBLE CHAIN BOOM
Filed Oct. 3, 1963 11 Sheets-Sheet 4
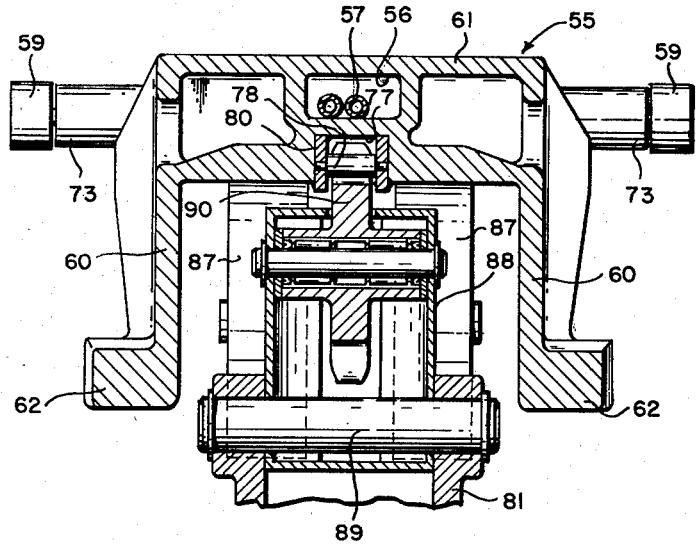
FIG___6
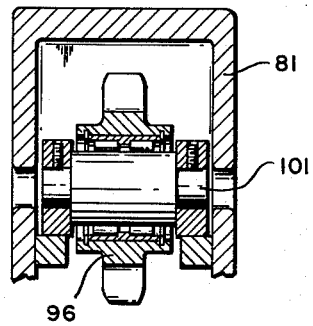
FIG___7
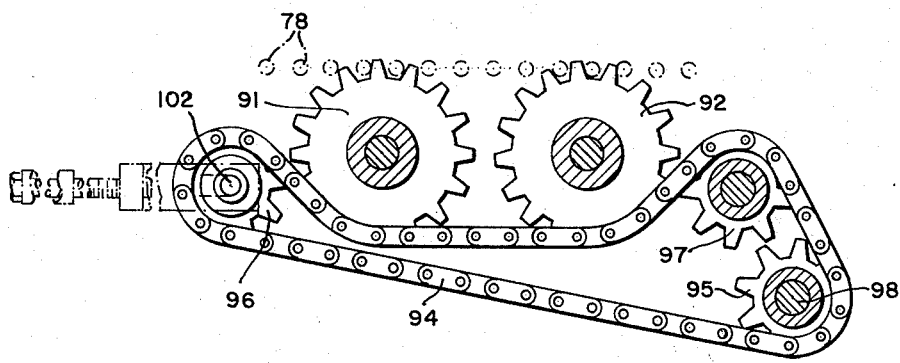
FIG___8
GEORGE N. BLISS
*INVENTOR.*
BY *Seedy Berry*
ATTORNEYS

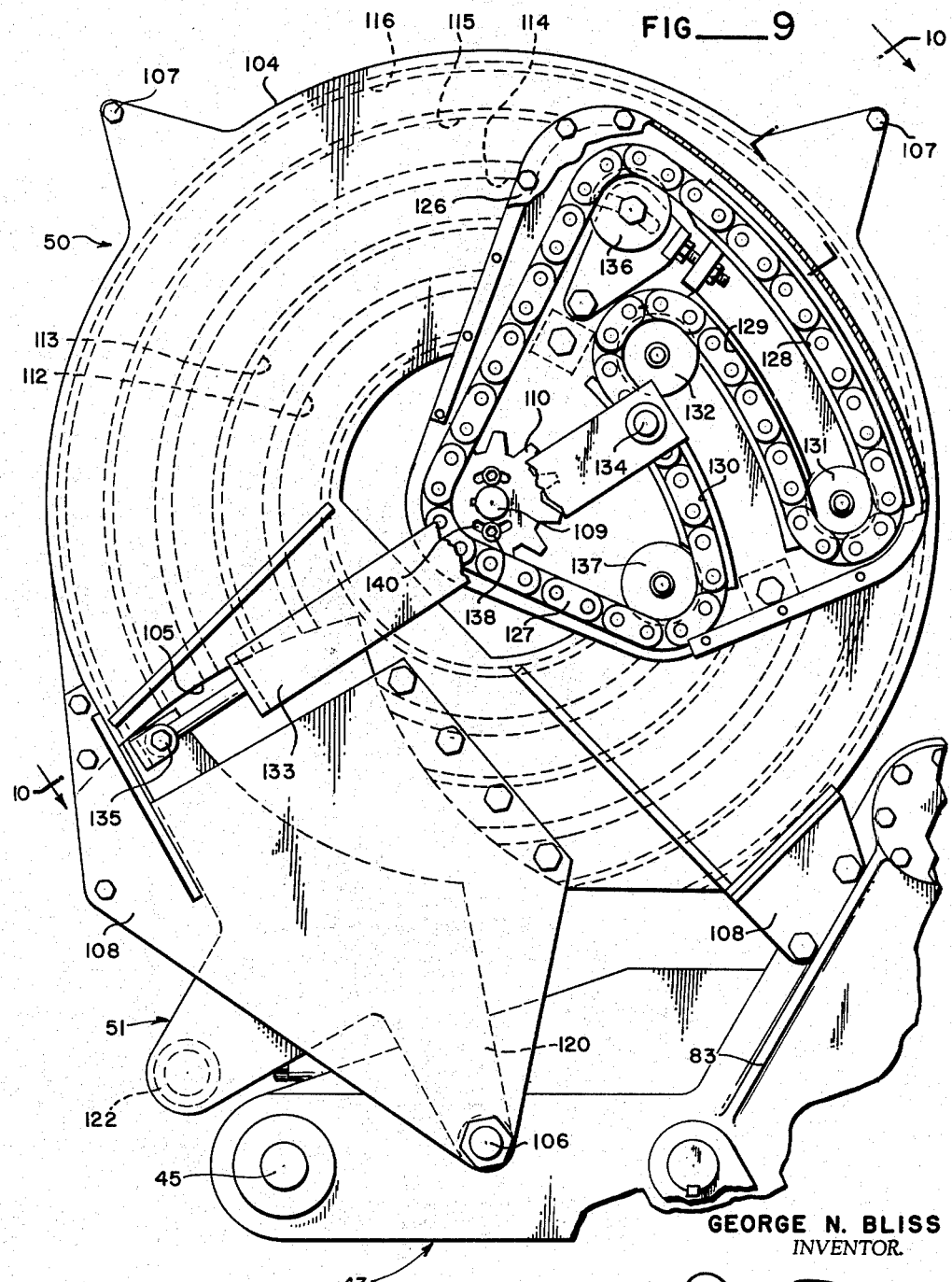

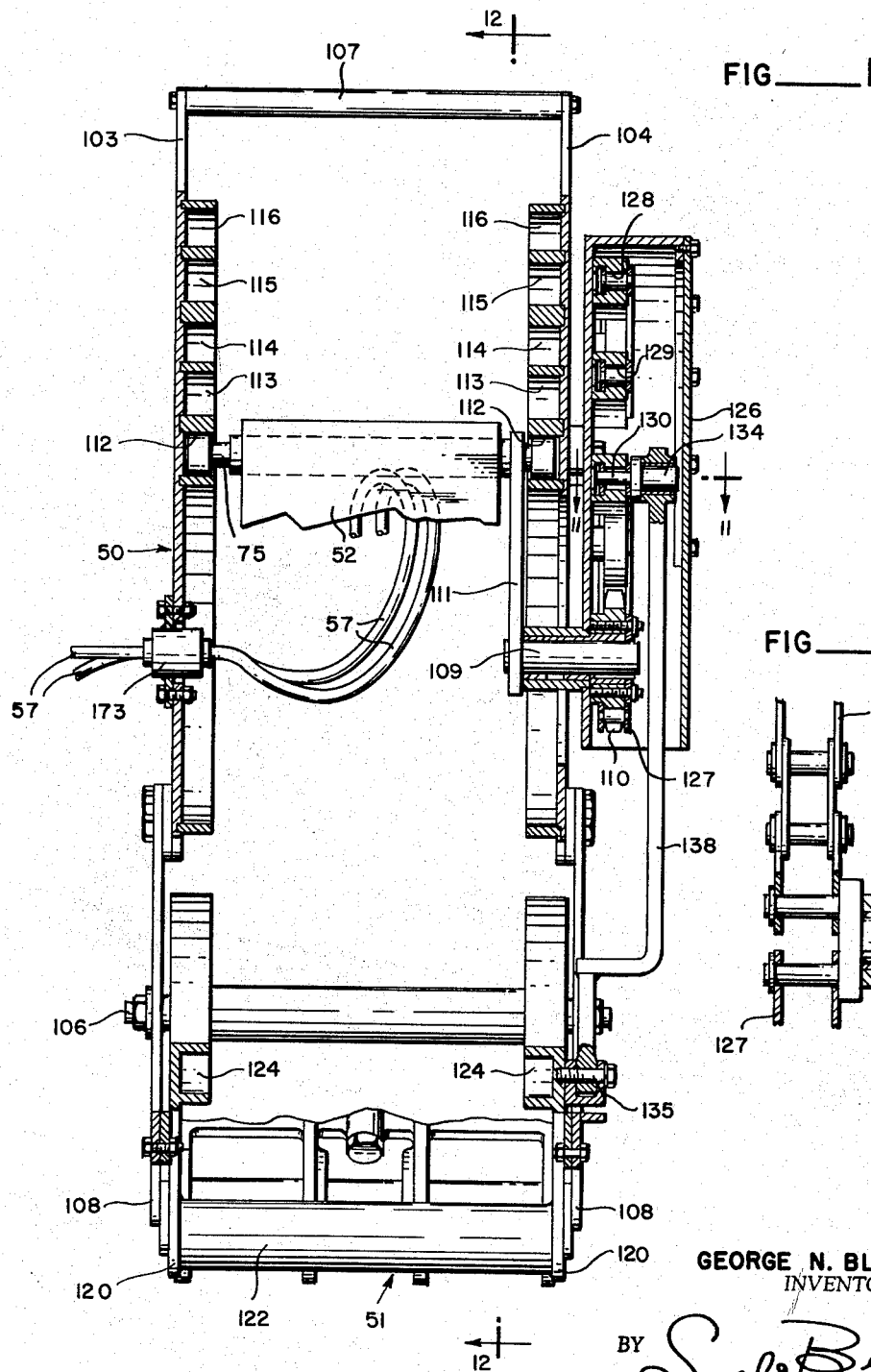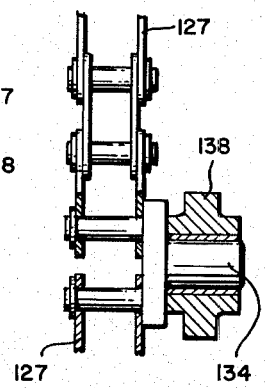

April 20, 1965  G. N. BLISS  3,179,267
EXTENSIBLE CHAIN BOOM
Filed Oct. 3, 1963  11 Sheets-Sheet 7
FIG___12
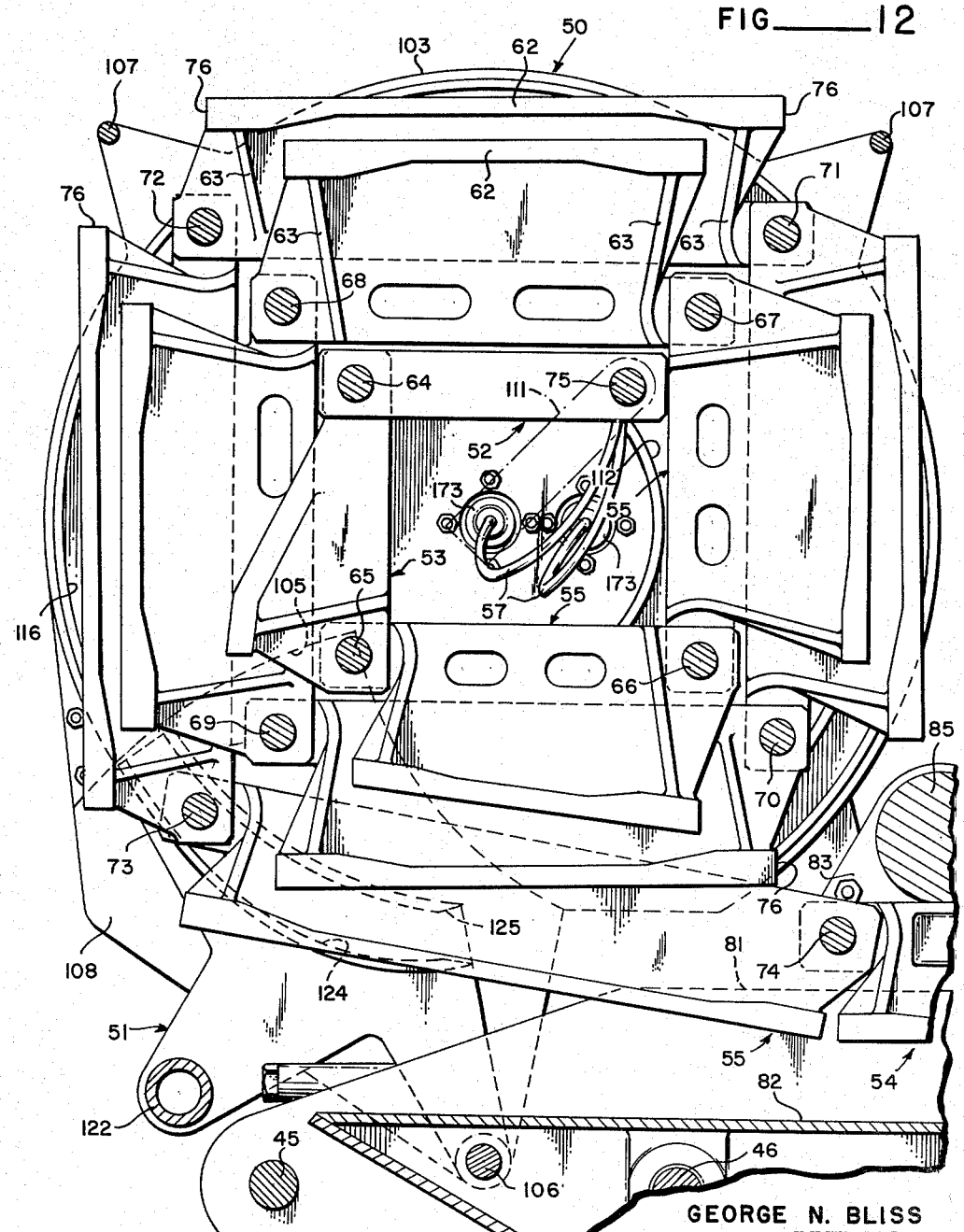
GEORGE N. BLISS
INVENTOR.
BY Seed & Berry
ATTORNEYS April 20, 1965
G. N. BLISS
3,179,267
EXTENSIBLE CHAIN BOOM
Filed Oct. 3, 1963
11 Sheets-Sheet 8
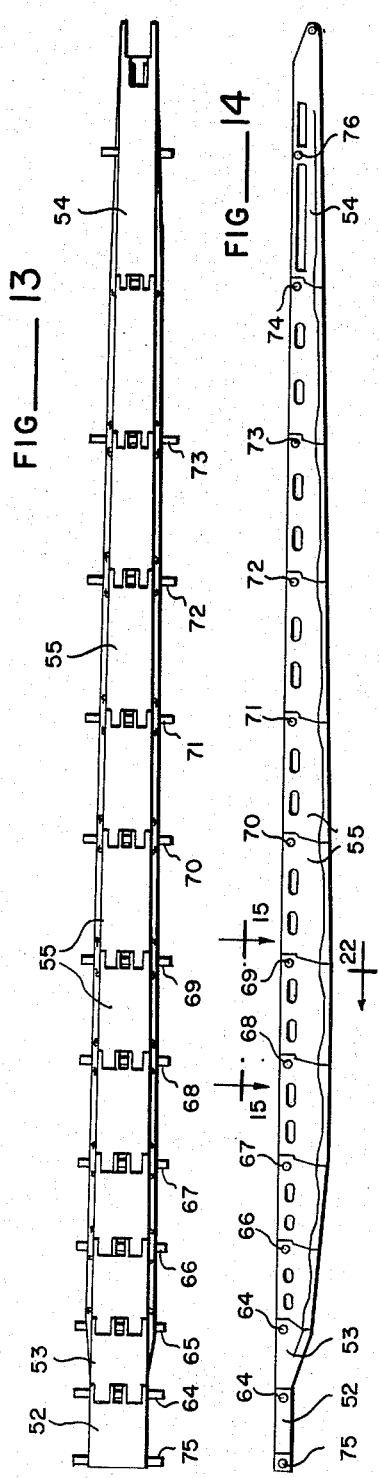
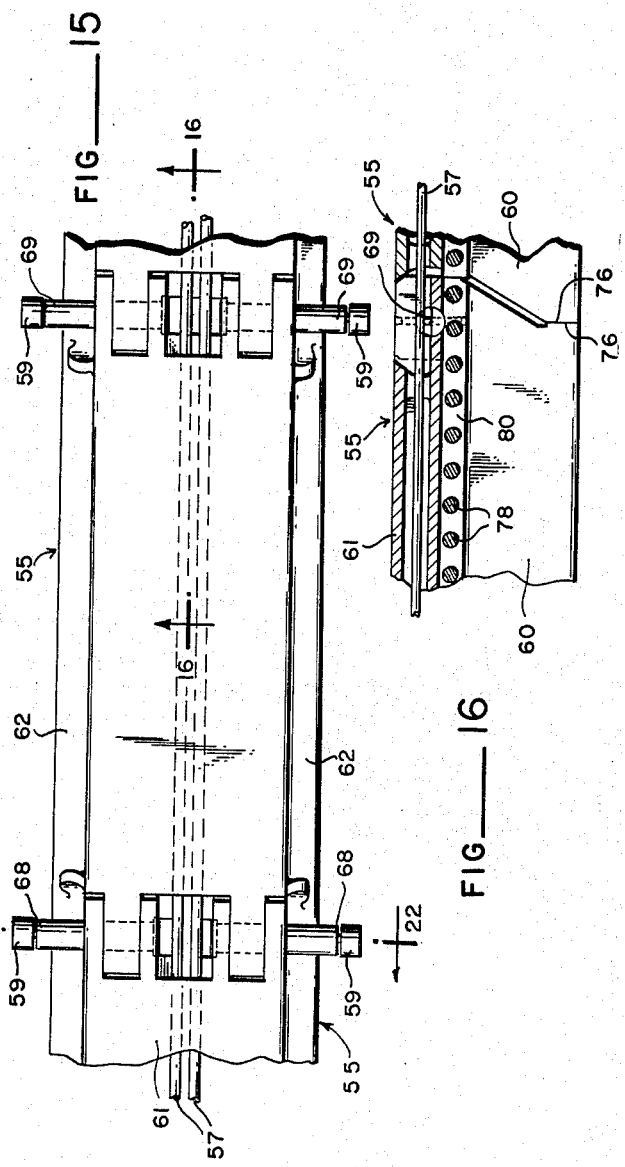
GEORGE N. BLISS
INVENTOR.
BY Seed & Berry
ATTORNEYS

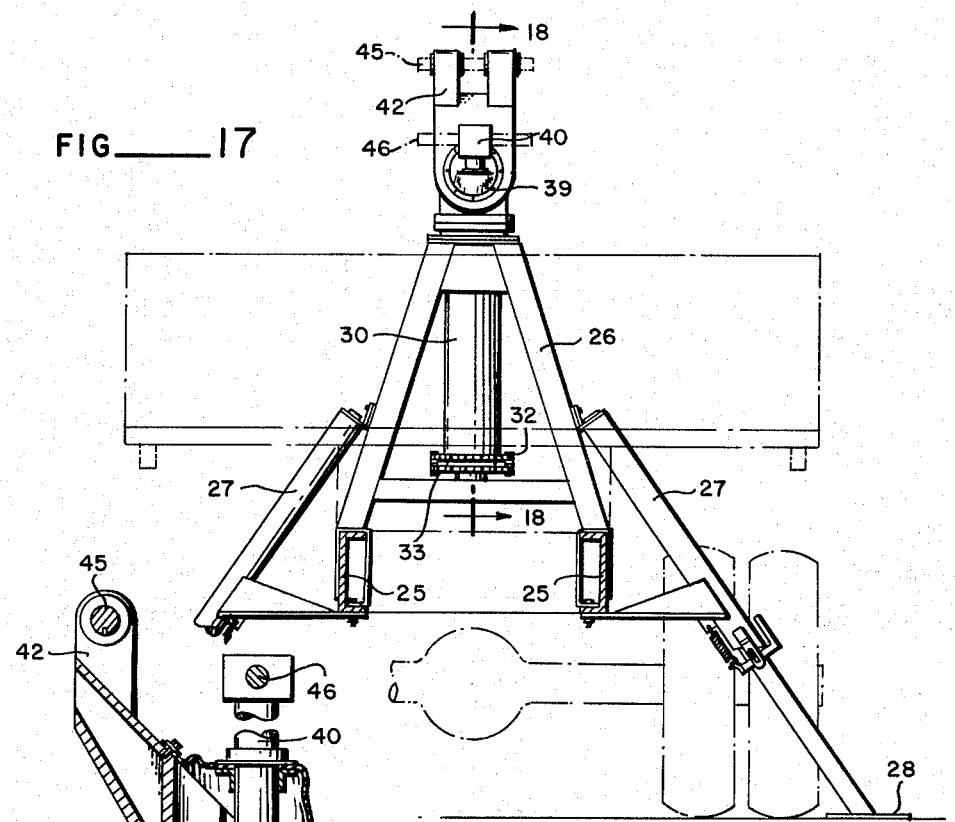
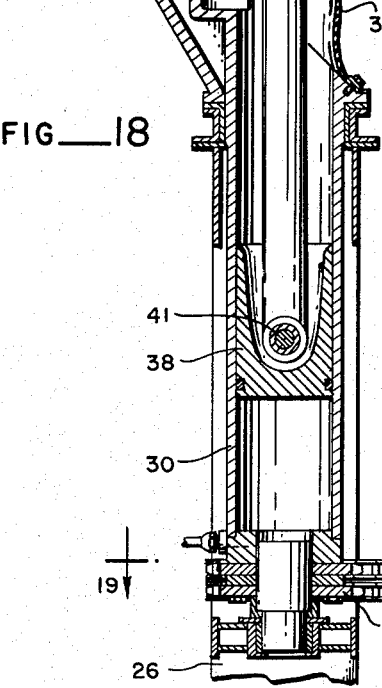
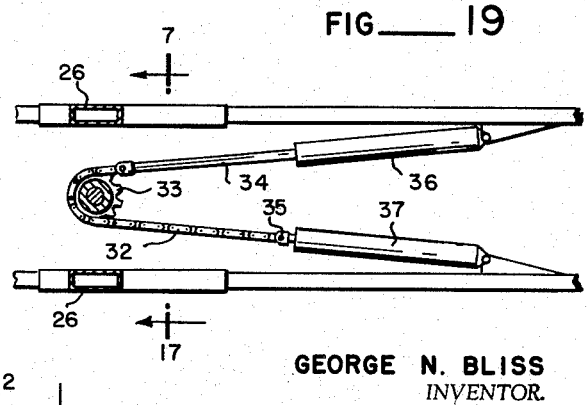
GEORGE N. BLISS
INVENTOR.
ATTORNEYS

April 20, 1965   G. N. BLISS   3,179,267
EXTENSIBLE CHAIN BOOM
Filed Oct. 3, 1963   11 Sheets-Sheet 10

GEORGE N. BLISS
*INVENTOR.*

BY Seed & Berry

*ATTORNEYS*

April 20, 1965　　　　　G. N. BLISS　　　　　3,179,267
EXTENSIBLE CHAIN BOOM
Filed Oct. 3, 1963　　　　　　　　　　　11 Sheets-Sheet 11
FIG____22
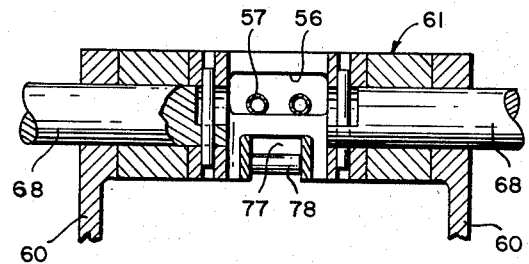
FIG____23
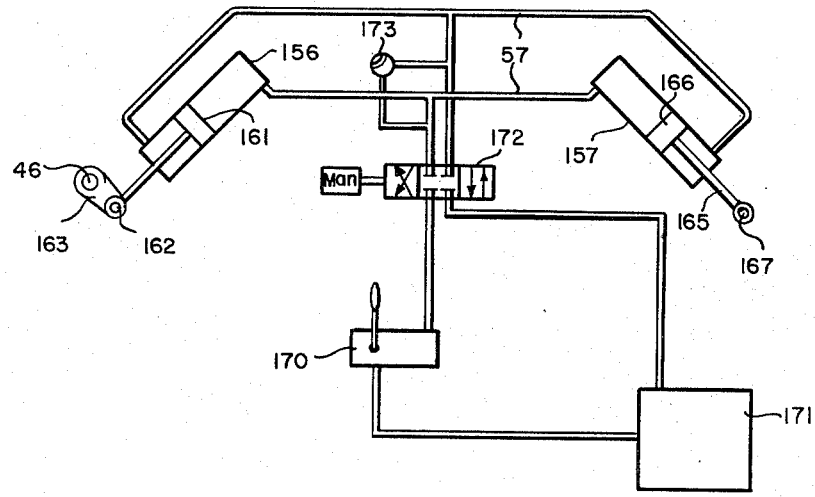
GEORGE N. BLISS
*INVENTOR.*
BY *Seed & Berry*
*ATTORNEYS*

United States Patent Office 3,179,267
Patented Apr. 20, 1965

3,179,267
EXTENSIBLE CHAIN BOOM
George N. Bliss, Friday Harbor, Wash., assignor to Fairey Canada Limited, a corporation of Canada
Filed Oct. 3, 1963, Ser. No. 313,580
23 Claims. (Cl. 214—141)

This invention relates to extensible chain booms, and namely booms composed of articulating links which wrap themselves spirally when the boom is contracted and produce a self-rigidifying straight arm when the boom is extended. For its general object the invention aims to provide an improved structure of this nature which can be extended and retracted with unusual ease and expedition.

It is one particular object of the invention to provide a chain boom having its several links so dimensioned and arranged that the chain wraps into a more compact condition than has been possible with chain booms as heretofore known, and such that each link occupies a predetermined exact position.

A further particular object is to provide a chain boom which admits of being more accurately controlled, and one providing greater usefulness by reason of variable length and also giving a wider range of permitted vertical swing than heretofore.

A yet additional object of the invention is to provide a chain boom having unusual torsional stability and a high strength to weight ratio.

As a still further particular object the invention aims to provide a chain boom in which the same is positively driven with complete absense of play both in its extension and retraction movements.

The boom of the present invention adapts itself to the mounting of a work-sustaining fitting upon its free end, and a yet further particular object of the invention is to engineer into the boom a hydraulic balance system which acts in response to a change in the angular relationship between the extended boom and a given reference plane to automatically shift the end fitting so that its angular relationship to the boom is modified inversely in a corresponding degree.

The invention has the still additional object of providing a chain boom so designed that lines, either hydraulic or electric, necessary or desirable for the operation of a terminal fitting are housed within the links of the chain.

These and other objects and advantages looking to the provision of a highly versatile chain boom of strong and durable construction will appear and be understood in the course of the following description and claims, the invention consisting in the novel construction and in the adaptation and combination of parts hereinafter described and claimed.

In said drawings:

FIGURE 1 is a perspective view illustrating a chain boom constructed to embody preferred teachings of the present invention and showing in phantom, by way of example, a load-carrying fork supported from its free end. The view also incorporates a phantom illustration of the frame of an automotive truck producing a mobile mounting for an A-frame which carries the boom.

FIG. 2 is a larger scale side elevational view of a driver foot which guides the boom during extension and retraction movements thereof, carries a power source for performing said extension and retraction of the boom, and provides a mounting for a magazine which serves as a storage housing for the links of the chain boom. The magazine is portrayed fragmentarily and the boom proper is shown in phantom.

FIG. 3 is a horizontal sectional view on line 3—3 of FIG. 2.

FIGS. 4, 5, 6 and 7 are fragmentary transverse vertical sectional views drawn to an enlarged scale on lines 4—4, 5—5, 6—6 and 7—7, respectively, of FIG. 2 and embodying in FIGS. 4 and 6 a full-line illustration of the boom proper.

FIG. 8 is a fragmentary longitudinal vertical sectional view drawn to an enlarged scale on line 8—8 of FIG. 3.

FIG. 9 is a side elevational view of the magazine with parts broken away and shown in section and incorporating a fragmentary showing of the associated driver foot, the employed scale being somewhat larger than that of FIGS. 2 and 3.

FIG. 10 is a transverse vertical sectional view on line 10—10 of FIG. 9.

FIG. 11 is a detail fragmentary sectional view drawn to an enlarged scale on line 11—11 of FIG. 10.

FIG. 12 is a fragmentary longitudinal vertical sectional view on line 12—12 of FIG. 10 and showing the links of the chain boom, and the pins which provide articulating connection, in the positions occupied when stored within the magazine.

FIG. 13 is a reduced-scale top plan view of the boom proper shown in an extended condition.

FIG. 14 is a side elevational view thereof.

FIG. 15 is a fragmentary enlarged-scale top plan viewed from the vantage point shown at 15—15 in FIG. 14.

FIG. 16 is a fragmentary longitudinal vertical sectional view on line 16—16 of FIG. 15.

FIG. 17 is a fragmentary transverse vertical sectional view on line 17—17 of FIG. 19 to illustrate the A-frame and the mobile mounting therefor.

FIG. 18 is a fragmentary longitudinal vertical sectional view drawn to an enlarged scale on line 18—18 of FIG. 17.

FIG. 19 is a fragmentary horizontal sectional view drawn to a reduced scale on line 19—19 of FIG. 18.

FIG. 22 is a fragmentary transverse vertical sectional view drawn to an enlarged scale on line 22—22 of FIG. 5; and FIG. 23 is a diagrammatic view of the referred-to balance system.

Figure 4:
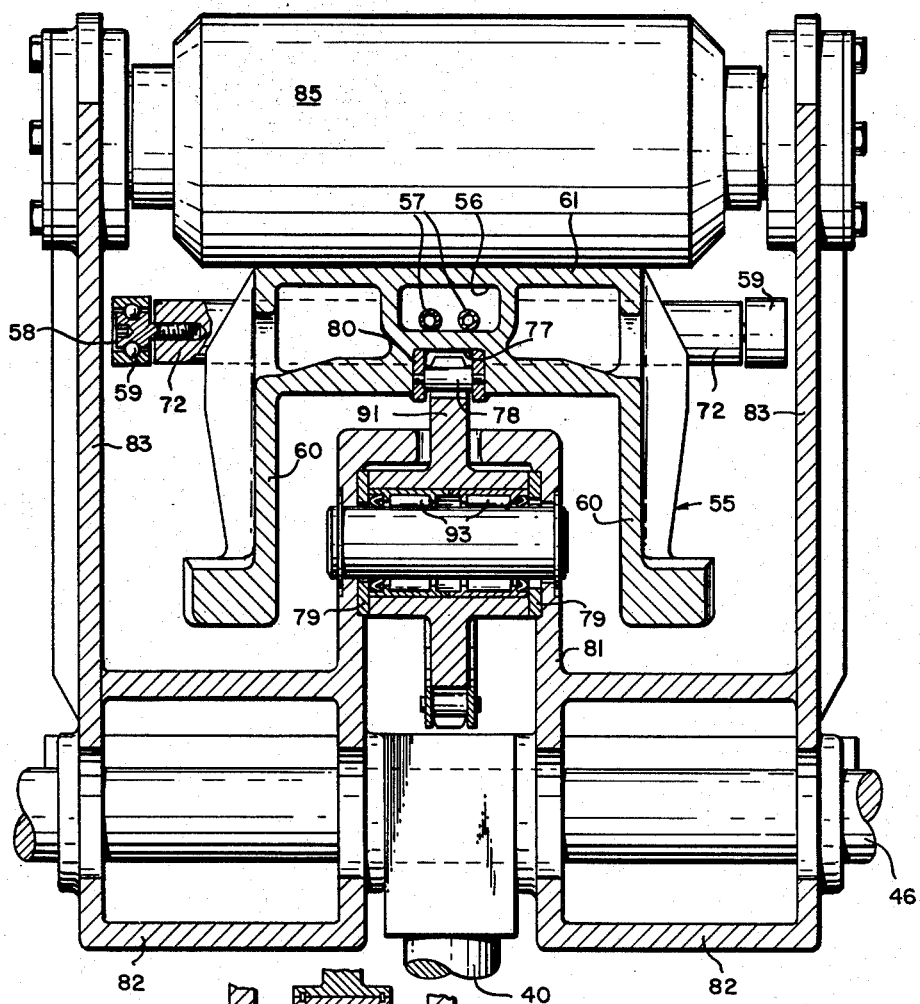
Figure 5:
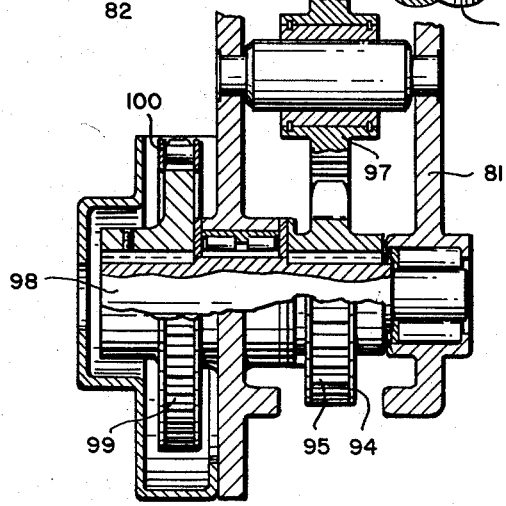

Referring to said drawings, the chain boom is shown mounted upon a mobile truck. The numeral 25 designates the longitudinal principals of the truck's main frame. An A-frame 26 rigidly surmounts these frame principals and has stabilizing outrigger feet 28 attached thereto, the feet being carried upon the outer ends of hydraulic jacks 27.

A hydraulic cylinder 30 receives a thrust and journal mounting from the A-frame. The cylinder is actuated in its swivel motion by a chain 32 which passes around a sprocket wheel 33 fixed to the lower end of the cylinder and has each of its two ends attached to a respective one of two piston rods, as 34 and 35, working in respective hydraulic cylinders 36 and 37 pivoted to the vehicle main frame.

The piston complement of the cylinder 30 is denoted by 38. A headed rod 40 is pivoted at 41 to the piston and projects upwardly through the open top of the cylinder and a flexible dust shield 39 which covers said opening. Above the A-frame, the cylinder presents a fork 42 which juts outwardly and thence upwardly, such as to place the head end in a position offset from the cylinder's swivel axis in a plane which coincides with the longitudinal median line of the vehicle when the cylinder lies at the mid-point of its prescribed swivel motion. The driver foot of the present invention, designated generally by 43, has its heel end perched on a pivot pin 45 which traverses the fork arms. Wrist pins 46 rigid with the head of the rod 40 and journalled in the driver foot at a point forwardly spaced from said perch act to swing the foot vertically about the perch pin by hydraulically controlled movement of piston 38 within the cylinder 30.

A magazine 50 which stores the links of the boom when the latter is retracted receives a rigid mounting upon the heel end of the foot, placing the foot tangent or approximately tangent to such magazine. The function of the foot, working in concert with a guide shoe 51, is to channel the links of the boom into and out of the magazine.

As here illustrated there are twelve links in the chain boom. Each differs in point of its shape. The configurations can be best seen from an inspection of FIGS. 12, 13 and 14. The innermost link 52 is substantially rectangular in plan and is generally planar when viewed from the end. The link 53 which articulates therewith has a triangular shape in side elevation, being planar upon the inner end and thence tapering to an inverted U-shape at the outer end so as to provide side walls 60 depending from a moderately thick web 61. The side walls have reinforcing flanges 62 and are further reinforced adjacent each end by vertical ribs 63. The outermost link 54 and each of the intervening links 55 have this inverted U-shape throughout their length but each, considered in plan, tapers inwardly in a moderate degree from the inner to the outer end. Registering tunnels 56 extend the entire length of each link on the substantial longitudinal median line and serve to accommodate hydraulic or other flexible service lines. The function of one such line or lines, designated by 57, will be hereinafter described. At each side of said tunnel on the articulating ends of the several links slots are cut into the webs to produce interfitting leaves, and horizontal stub-pins are inserted from opposite ends through these interfitting leaves to produce the articulating connection between the links. Dowels (FIG. 22) anchor the stub-pins against endwise displacement. Considered from the inner to the outer end, these articulating pins are designated by 64, 65, 66, 67, 68, 69, 70, 71, 72, 73 and 74. For a purpose which will hereinafter appear, pins 64 through 73 each project by their ends laterally beyond the side walls of the links, and a pin 75, likewise projecting by its ends, traverses the inner end of the link 52. Said projecting pins 75 and 64 through 73 have spindles 58 fixed to and extending axially beyond each of the two ends. Rollers 59 receive journal mountings from these spindles. The flanged lower edges of the meeting ends of the several U-shaped links present butting shoulders 76 located in each instance in a plane perpendicular to the concerned web and containing the axis of articulation. Best seen from an inspection of FIGS. 4, 6 and 16, the webs of the third through the twelfth link, namely the several links 55 and the link 54, have upon their underside a respective channel 77 located on the longitudinal median line of the boom. Sets of spaced-apart transverse pintles 78 occupy the channels and produce racks, receiving rotary journals from side bars 80 which are welded in place.

Reverting now to the driver foot, the same provides a central beam 81 which is sectionally of an inverted-U configuration and along the base portion thereof, from the approximate mid-length to the heel extremity, has hollow wings 82 extending laterally from each side. Stanchion plates 83 rise from the side edges of the flanges to a height well above the upper level of the beam and provide journal mountings for transverse rollers 85 and 86 which overlie the beam section. The links of the chain boom are arranged to straddle the beam section, with the underside of the webs 61 riding upon dolly wheels 87 and the upper side bearing against the rollers 85 and 86. Such dolly wheels 87 (see FIGS. 2 and 6) are carried by a rocker bar 88 mounted at the toe end of the beam section by a pivot pin 89, and also carried by such rocker bar for engagement with the rack-forming pintles 78 is an idler sprocket wheel 90.

The driver foot carries two live driver sprocket wheels 91 and 92 to occupy in-line positions one to the front and the other to the rear of the overhead roller 86. The hubs of the driver sprocket wheels are journaled for rotation on needle bearings 93 and have the hub ends bearing against thrust washers 79. The driver wheels mesh the rack teeth 78 to perform the driving function of the foot. To obviate slack in the chain boom, such two live sprocket wheels (see FIG. 8) are spaced one-half pitch apart so that as the teeth of one sprocket wheel are in contact with the front and the back sides of successive rack teeth the teeth of the other sprocket wheel are contacting back and front sides, respectively, of other rack teeth. An endless chain 94 trained about a powered sprocket wheel 95 and two idler sprocket wheels 96 and 97 has its upper run engaging the driver sprocket wheels 91 and 92 to drive the latter. A live axle 98 to which the powered sprocket wheel 95 is keyed projects laterally from one side of the beam 81. A sprocket wheel 99 is keyed to this projecting end and is driven by an endless chain 100 from a reversible hydraulic motor 101. The shaft 102 for the idler sprocket wheel 96 is mounted for adjustment in a direction endwise to the beam for tensioning the driver chain 94. It will be apparent that the sprocket wheels 91 and 92, by tracking in the channels 77, guide as well as drive the boom in the latter's extension and retraction movements. Driver wheels 91 and 92 are perforce complemented by wheels 87 and 90 in performing the guide function.

Proceeding now to describe the magazine 50, the same is fabricated from a pair of cheek plates 103 and 104. The cheek plates have a generally circular shape other than for cut-outs at the bottom. The re-entrant openings which these cut-outs produce are somewhat triangular in shape with the back edge 105 comprising the arc of a circle lying more or less on a diameter of the magazine and having as its center a pivot pin 106 extending transversely of the driver foot midway between the pivot pin 45 and the trunnion pins 46. Spacers 107 separate the cheek plates at the top. At the bottom brackets 108 provide a rigid attachment between the magazine and the driver foot. Cheek plate 104 supports a journal box at its substantial center, and a stub shaft 109 is received for rotation in this box with one of its ends exposed to the inside and the other end exposed to the outside of the magazine. A sprocket wheel 110 is secured to such outer end. A crank arm 111 is fixed to the inner end. The length of this crank arm is somewhat less than half the radius of the magazine. Its free end is pivotally attached to an exposed end of the pin 75, namely the pin which traverses the inner end of the innermost boom link 52.

Mutilated by the cut-outs but otherwise extending circumferentially concentric to the rotary axis of the stub shaft 109, the two cheek plates present companion sets of inwardly facing track grooves, as 112, 113, 114, 115 and 116. The radius of the inner groove 112, median line considered, corresponds to that of the crank arm 111. The other grooves are spaced at equidistant intervals therefrom. The grooves serve as track-ways for the terminal rollers 59 of the pins 75 and 64 through 73, having a width somewhat wider, say 1/8", than the diameter of such rollers.

It should be here pointed out that when the boom occupies the outer extreme of its extension movement, and this is prescribed by the absence of track teeth on the underside of the two innermost links, the ends of the terminal pin 75 register with the companion grooves 112 at the entrance end of the latter, this being the end which occurs along the back edge 105 of the cut-out. It will be understood that as the driver sprocket wheels are powered in their boom-retracting direction of rotation the rollers 59 of the terminal pin 75 move within the track 112 in a clockwise direction as viewed from the vantage point of FIG. 9. As this clockwise movement progresses, first the pin 64 and then each of the following pins 65 through 72 in turn, are caused to be guided into a related one of the several tracks 113, 114, 115 and 116. It is the function of the shoe 51 to perform this guide office.

Shoe 51 is comprised of two side plates 120 disposed co-planar one with one and the other with the other of the two cheek-plates 103 and 104 and joined by an integral spacer 122. The shoe is pivoted by said pin 106 to the root end of the driver foot for reciprocal swing motion about a transverse horizontal axis. Each of the side plates, along an inner side margin thereof, presents a respective one of two inwardly facing companion grooves 124 producing a guide track which is a substantial counterpart of the magazine tracks. Track 124, in the swing motion of the shoe, is made to register by its outer end successively with the tracks 112, 113, 114, 115 and 116. Throughout the full range of the shoe's swing travel the inner or front end of track 124 moves along more or less of a horizontal path with the level coinciding with that travelled by pins 65 through 72 as the latter traverse the length of the driver foot. A flared lead-in mouth 125 is provided at said inner end of the guide track. The pins successively enter and leave the mouth from and to the driver foot as the chain boom is retracted and extended respectively. Shoe 51 is shown in the drawings at the outer extreme of its swing motion, a position occupied when the chain boom is fully retracted.

The function of the sprocket wheel 110 is to shift the guide shoe between the two limits of its swing travel, producing movement in timed concert as between the guide shoe and the chain boom in that the sprocket wheel is caused to turn by the crank arm 111 as the latter swings with the pin 75 of the chain link 52. The sprocket wheel occupies an open-bottom chain case 126 secured upon the outer face of cheek plate 104 and within this case drives an endless timing chain 127 which is so trained as to traverse three paralleling equidistantly spaced runs each concentric with the rotary axis of the stub shaft 109 and hence having the same center as the tracks 112 through 116 of the magazine. Slide-ways 128, 129 and 130 guide the timing chain along said runs, and in its movement between the outermost run and the intermediate run and between the intermediate run and the outermost run the chain is trained over rollers 131 and 132, respectively. Rollers 136 and 137 lead the timing chain into and from the opposite end limits of said three chain runs. Roller 136 is adjustably mounted to permit take-up of slack in the chain. Timing adjustment as between the sprocket wheel 110 and the crank arm 111 is provided by the instrumentality (see FIG. 9) of fixing a hub upon the stub shaft 109 and attaching the sprocket wheel to the hub by bolts 138 passing through arcuate slots 140. The radial spacing between median lines of the chain runs 128 and 129 corresponds to the radial spacing between median lines of the two concentric tracks 112 and 114. The radial spacing between the median line of said run 129 and that of the run 130 corresponds to the radial spacing between median lines of the tracks 114 and 116. A critical relationship which will be hereinafter pointed out also exists between the length of the runs 128, 129 and 130 and the distances between pins of the chain boom.

Figure 20:
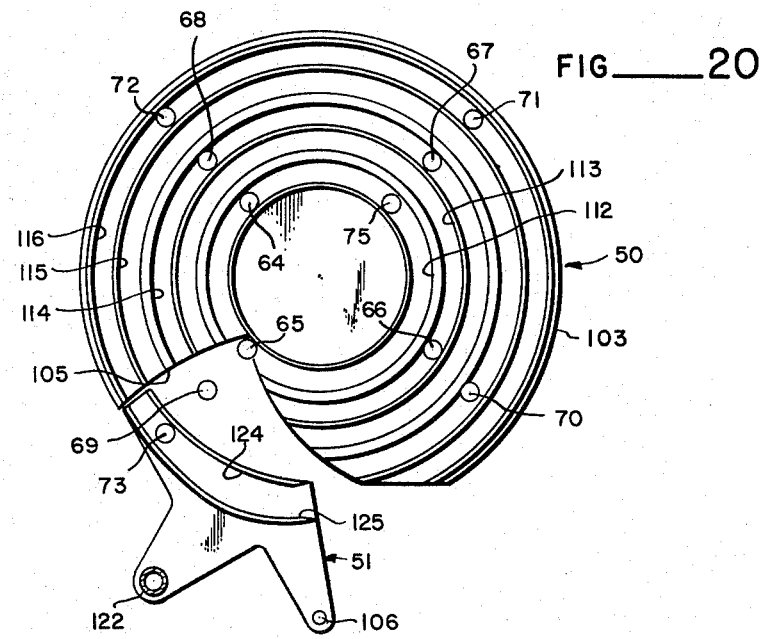
FIG. 20 is a view similar to FIG. 12, albeit being somewhat schematic, showing said several articulating pins in the positions occupied when the chain boom is fully retracted.
Figure 21:
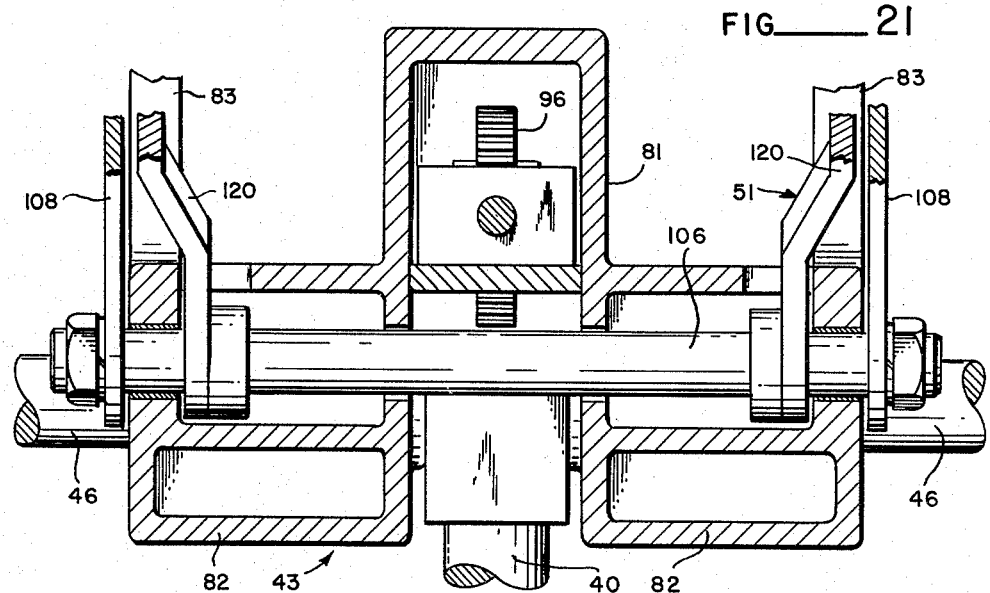
FIG. 21 is a transverse vertical sectional view drawn to an enlarged scale on line 21—21 of FIG. 3.

A bar 133 extends through the bottom opening of the chain case 126 between a wrist pin 134 which is attached to adjoining links of the timing chain and a wrist pin 135 (see FIG. 9) attached to the free end of the guide shoe 51. This bar lies more or less diametrically of the magazine. Its function is to interruptedly shift the outer end of the guide shoe 51 radially of the magazine about the pivot pin 106 in timed concert with the retraction and extension movements of the chain boom. As previously stated, when the boom is fully extended the terminal pin 75 occupies a position at the entrance end of the trackway 112. When the chain is fully retracted the terminal pin lies in the position shown in FIGS. 12 and 20, the pin having in the interim made several circuits of such track-way. During such retraction, the crank arm 111, in consequence of turning with the pin 75, drives the timing chain and during these several turns causes the wrist pin 134 to move first along the run 128, then over the roller 131, then along the run 129, then over roller 132, and finally along the run 130. In the extreme which it occupies when the chain boom is fully retracted, the wrist pin lies at the end of the inner run-way 130 proximal to the roller 137. In the extreme which it occupies when the chain boom is fully extended, the wrist pin lies at the end of the outer run-way 128 proximal to the roller 136. To reiterate, moving between said outer (boom extended) extreme and the inner (boom retracted) extreme, the wrist pin 134 successively travels the length of the three run-ways 128, 129 and 130, passing around the rollers 131 and 132 in moving from the tail end of one to the head end of another said run-way. Responsively shifting the bar 133 and by such shifting interruptedly moving the guide-shoe in the latter's permitted swing movement, the slide-way 124 of such shoe is caused to register with each of the track-ways 112, 113, 114, 115 and 116 in turn. Registration with the track-ways 113 and 115 is only momentary and occurs as the wrist pin arrives at substantially the mid-point of its travel over the roller 131 and the roller 132, respectively. The period of registration is comparatively long in respect of the track-ways 112, 114 and 116 and during these three periods the pins 75, 64 and 65 are fed into the track-way 112, the pins 67, 68 and 69 into the track-way 114, and the pins 71 and 72 into the track-way 116. The pins 66 and 70 are fed during periods of momentary registration, the former into the track-way 113 and the latter into the track-way 115. A similar positioning as between the guide shoe and the several track-ways, albeit in the reverse order, takes place as the wrist pin travels between said two extremes of its prescribed travel during extension of the chain boom.

It will be particularly noted that a nesting of the links of the chain boom obtain as successive wraps develop within the magazine. When the boom is fully retracted, the eleventh and seventh links nest within the seventh and third links, respectively, the tenth and sixth links within the sixth and second links, respectively, the ninth link within the fifth link, and the eighth link within the fourth link. The planar first link underlies the fifth link. The several pins 75 and 64 through 73, inclusive, each has a respective prescribed orbital travel as wrapping and unwrapping takes place. The pins take and maintain a predetermined constant relationship, lining up in a radial pattern clearly seen from an inspection of FIGS. 12 and 20.

By way of example the boom is shown as having a fork lift suspended from its free end. It will be apparent that this is but one of a number of terminal fittings to which the boom adapts itself. The fork arms 150 are illustrated as being suspended from a yoke to which a post 151 is rigidly attached. A sleeve 153 is pivoted at 154 to the outer extreme end of the boom link 54 for swing motion about a transverse horizontal axis, and has the post keyed therein. A thrust collar 155 carried on the head end of the post bears upon the sleeve.

The invention provides a balance mechanism functioning to constantly maintain the post 151 and the piston rod 40 in a parallel relation. Provided for this purpose are two pairs of double-acting hydraulic cylinders 156 and 157 connected in a closed hydraulic circuit. Cylinders 156 are pivoted at 158 to the upper ends of the stanchions 83 of the driver foot. The rods 160 of associated pistons 161 (FIG. 23) are pivoted at 162 to the free ends of respective levers 163 which are keyed to the trunnion pins 46, thus causing the pistons to move directively from and toward the cylinders' inner or root ends when the boom is raised and lowered, respectively. Cylinders 157 lie at opposite sides of the boom link 54 and are pivoted at 164 to said link at a point longitudinally offset from the pivot axis 154. Rods 165 of the associated pistons 166 (FIG. 23) are pivoted at 167 to the free lower end of the sleeve 153. One of said two hydraulic hoses 57 connects the inner ends of the two sets of cylinders and the other hydraulic hose connects the outer ends of the two sets of cylinders. Hydraulic fluid displaced from either end of cylinders 156 is forced into the corresponding end of the cylinders 157 so that the two sets of pistons move oppositely in concert. Balancing adjustment of the relative position of the two sets of pistons is afforded by a wobble pump 170 drawing fluid from a reservoir 171 and supplying same through a 3-position valve 172 to either of the two hydraulic sides 57 selectively, used in complement with a normally closed cross-over valve 172 when replenishing fluid lost by leakage and/or providing a compensating adjustment for hillside operations which place the truck frame 25 at an inclination to the horizontal. Although somewhat slower in action the two sets of cylinders 156 and 157 can be single-acting if desired, employing only a single hose 57 connecting the outer ends of the cylinders and employing gravity loading as a countering influence.

Hoses 57 extend from cylinder 157 through the registering tunnels 56 of the several links, issuing within the magazine from the link 52 and thence connecting with respective hydraulic swivels 173. Slack in these latter connections allows the hoses to interwind without problems. To obviate interwinding, the two indicated swivels may be carried by opposite walls of the magazine rather than the one wall, as shown. Extensions of the hoses lead externally of the magazine between the hydraulic swivels and the cylinder 156.

The hydraulic system for the reversible motor 101 and the cylinders 27, 30, 36 and 37 has the usual reservoir, pump, and manual control valves, with the latter located in positions convenient to the operator.

It is thought that the structural nature of the invention and the manner of its operation will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits. Where used therein in reference to a relationship between links of two adjacent wraps stored in the magazine, the term "nested" is to be construed as meaning an interfit of one link in another link.

What I claim is:

1. A retractable chain boom comprising a row of links hinged to one another on axes which extend transverse to the row, and a magazine for storing the links in multiple wraps and to and from which the links are fed as the boom is retracted and extended, respectively, the several links contained in the outer wrap of any two adjacent wraps of the stored chain each being of such a predetermined greater length than the several links contained in the inner of said two adjacent wraps that generally radial lines projected from a common center through the hinge axes of each of the several links of any given wrap contain, in the instance of each such radial line, the hinge axis of a link occupying a next adjacent wrap.

2. The chain boom of claim 1 in which the stored links of one wrap have nesting engagement with stored links of a next adjacent wrap.

3. A retractable self-rigidifying chain boom comprising a row of links hinged to one another on horizontal axes which extend transverse to the row with each link providing an end surface spaced below the hinge axis and arranged to be brought against the facing surface of a next adjacent link in the row when the links are in the relative positions occupied when the boom becomes rigid, and a magazine for storing the links in multiple wraps and to and from which the links are fed as the boom is retracted and extended, respectively, the several links contained in the outer wrap of any two adjacent wraps of the stored chain each being of such a predetermined greater length than the several links contained in the inner of said two adjacent wraps that generally radial lines projected from a common center through the hinge axes of each of the several links of any given wrap contain, in the instance of each such radial line, the hinge axis of a link occupying a next adjacent wrap.

4. A chain boom according to claim 3 having a walkway of extended length fixed to the magazine and prescribing a guided travel path for the links as the latter are fed to and issue from the magazine.

5. The chain boom of claim 3, the magazine having a driver foot fixed thereto and formed to provide a walkway of extended length for the travel of the links as the latter are fed to and issue from the magazine, selected links in the chain each having teeth closely spaced at intervals of the length thereof to form a continuous rack, and a pinion carried by the driver foot in a position to mesh said rack and power-driven in converse directions of rotation for extending and retracting the boom.

6. A chain boom according to claim 5 in which the rack-forming teeth are comprised of rotatively journaled pintles.

7. A chain boom according to claim 5 having two of said power-driven pinions occupying spaced in-line positions with the teeth of one pinion shifted a half-pitch, relative to the teeth of the rack, from the teeth of the other pinion.

8. A chain boom according to claim 3, pins which produce the hinge articulation for the links projecting by their ends laterally beyond side edges of the links, side walls of the magazine providing grooves receiving said exposed ends of the pins as the links wrap within the magazine.

9. The chain boom of claim 8 in which the links are formed so as to nest when stored within the magazine.

10. A chain boom according to claim 8 having rollers journaled upon the exposed ends of said hinge pins for rotation about the hinge axis as a center.

11. The chain boom of claim 1, the articulation between the links comprising hinge pins having exposed ends which project laterally beyond side edges of the links, side walls of the magazine providing radially spaced grooves mutilated by a re-entrant cut-out and developed concentric to said common center, the exposed ends of the pins tracking in said grooves as the links wrap and unwrap, means being provided mounted from the magazine for governed movement within said cut-out to guide the exposed ends of the hinge pins into the grooves.

12. The chain boom of claim 11 in which the radial spacing is approximately the same between any two adjacent grooves.

13. The chain boom of claim 11 in which the links are formed so as to closely nest when stored within the magazine and by such nesting hold the hinge pins of links which have been previously fed to the magazine against displacement radial to said common center as said pins traverse the mutilating cut-out in the course of travelling the orbital paths which the grooves prescribe.

14. A chain boom according to claim 1 having a power device upon the outer end of the boom, and wherein the several links provide registering tunnels extending the length of each link in the plane occupied by the hinge axes of the concerned link and arranged to receive a service line supplying power to the power device.

15. A retractable self-rigidifying chain boom comprising a row of links hinged to one another on horizontal axes which extend transverse to the row, a magazine for storing the links in multiple wraps and having a walk-way of extended length rigid therewith along which the links are guided to and from the magazine as the boom is retracted and extended, respectively, a mounting base having a perch thereon supporting the walk-way for vertical swing movement about a transverse horizontal axis, and a power-operated extensible means footing upon the base and engaging the walk-way at a point longitudinally offset from said swing axis for setting the walk-way at selected inclinations, opposite side walls of the magazine being each provided with radially spaced grooves developed concentric to a common center and mutilated by a re-entrant cut-out, hinge pins for the links having projecting ends adapted to track in said grooves during wrapping and unwrapping of the links, means being provided mounted for reciprocal swing motion in the space provided by said cut-outs for guiding said pin ends between the walk-way and the grooves.

16. Structure as recited in claim 15 having means connecting the chain and said pin-guiding means causing the latter to move in its said reciprocal swing motion in timed concert with endwise motion given to the chain.

17. Structure as recited in claim 15 in which a selected succession of the links each has teeth closely spaced at intervals of the length to form a continuous rack and having bearing walls along each side of the rack, a succession of in-line live pinions carried by the driver foot in a position to mesh said rack, and power means for driving the pinions, the span between said bearing walls being only moderately wider than the teeth of the pinions.

18. A retractable chain boom comprising a row of links hinged to one another on axes which extend transverse to the row, a magazine for storing the links and to and from which the links are fed as the boom is retracted and extended, respectively, a walk-way of extended length prescribing a guided travel path for the links as the latter are fed to and issue from the magazine, selected links in the chain each having teeth closely spaced at intervals of the length thereof to form a continuous rack, and drive means engaging the rack for extending and retracting the boom, said drive means comprising at least two live pinions occupying spaced in-line positions with the teeth of one live pinion shifted a half-pitch, relative to the teeth of the rack, from the teeth of the other live pinion.

19. A retractable chain boom comprising a row of links hinged to one another on axes which extend transverse to the row, a magazine for storing the links and to and from which the links are fed as the boom is retracted and extended, respectively, a walk-way of extended length prescribing a guided travel path for the links as the latter are fed to and issue from the magazine, selected links in the chain each having teeth closely spaced at intervals of the length thereof to form a continuous rack, and a pinion carried by the walk-way in a position too mesh said rack and power-driven in converse directions of rotation for extending and retracting the boom, said links when viewed from an end during their traversal of the walk-way having the shape of an inverted-U to produce a downwardly facing channel, the openings which lie between the teeth of said rack and into which the teeth of the drive pinion are received being recessed into the upper wall of said channel with their width being only moderately wider than the teeth of the pinion, the side walls of the channel having a depth greater than the thickness of the upper wall of the channel.

20. A retractable chain boom comprising a row of links hinged to one another on axes which extend transverse to the row, and a magazine for storing the links in multiple wraps and to and from which the links are fed as the boom is contracted and extended, respectively, the boom carrying a power device upon its outer end, the several links providing registering tunnels extending the length of each link in the plane occupied by the hinge axes of the concerned link and arranged to receive a service line supplying power to the power device.

21. A chain boom according to claim 1 in which the links have a channel shape when viewed from an end, the channels facing outwardly when the chain is stored, each of the several links contained in the outer wrap of any two adjacent wraps having a nesting interfit with the radially aligned link of the inner of said two adjacent wraps, said links diminishing in width progressively from the inner to the outer end of the boom as an accommodation to said nesting interfit.

22. A retractable self-rigidifying chain boom comprising a row of links hinged to one another on horizontal axes which extend transverse to the row, a magazine for storing the links in multiple wraps and having a walk-way of extended length rigid therewith along which the links are guided to and from the magazine as the boom is contracted and extended, respectively, a mounting base having a perch thereon supporting the walk-way for vertical swing movement about a transverse horizontal axis, a power-operated extensible means footing upon the base and engaging the walk-way at a point longitudinally offset from said swing axis for setting the walk-way at selected inclinations, a mounting means carried upon the outer end of the chain for pivotal movement about a transverse horizontal axis and serving as a support for a terminal accessory, and means acting upon said end mounting means to maintain a given reference axis of the latter at a constant angle relative to the vertical regardless of the inclination occupied by the extended boom.

23. The chain boom of claim 22, the means for maintaining said constant angle comprising two cylinders connected in a closed hydraulic system with one said cylinder responding to changing inclinations of the extended boom and the other said cylinder transmitting countering motion to the end mounting means.

References Cited by the Examiner
UNITED STATES PATENTS

| | | | |
|---|---|---|---|
| 2,461,429 | 2/49 | Larson | 182—41 |
| 2,481,471 | 9/49 | Crot | 189—34 |
| 2,990,072 | 6/61 | Mindrum | 214—140 |
| 2,998,861 | 9/61 | Hotchkiss | 182—2 |

HUGO O. SCHULZ, *Primary Examiner.*

MORRIS TEMIN, *Examiner.*